United States Patent [19]

Lanni et al.

[11] Patent Number: 5,801,881
[45] Date of Patent: Sep. 1, 1998

[54] FIELD SYNTHESIS AND OPTICAL SUBSECTIONING FOR STANDING WAVE MICROSCOPY

[75] Inventors: Frederick Lanni; D. Lansing Taylor; Brent Bailey, all of Pittsburgh, Pa.

[73] Assignee: Carnegie Mellon University, Pittsburgh, Pa.

[21] Appl. No.: 392,496

[22] Filed: Feb. 23, 1995

Related U.S. Application Data

[63] Continuation-in-part of Ser. No. 14,328, Feb. 5, 1993, Pat. No. 5,394,268.
[51] Int. Cl.$^6$ .................. G02B 21/06; G02B 21/00
[52] U.S. Cl. .................. 359/386; 359/368; 359/385
[58] Field of Search .................. 359/368–390; 250/216, 234–236, 458.1, 459.1, 461.1

[56] References Cited

U.S. PATENT DOCUMENTS

| | | | |
|---|---|---|---|
| 4,311,358 | 1/1982 | Gibbons | 359/385 |
| 4,621,911 | 11/1986 | Lanni et al. | 359/368 |
| 4,917,462 | 4/1990 | Lewis et al. | 359/368 |
| 5,073,018 | 12/1991 | Kino et al. | 359/368 |
| 5,225,923 | 7/1993 | Montagu | 359/368 |
| 5,386,112 | 1/1995 | Dixon | 359/368 |

OTHER PUBLICATIONS

Proceedings Of The Spie: Los Alamos Conference On Optics, vol. 190, 23 May 1979, Los Alamos, NM. US, P. A. Temple, "Improved Dark–field–like Surface Inspection Technique using Total Internal Reflection".

Soviet Patents Abstracts, Section EI, Week 9218, Derwent Publications Ltd., London, GB; Class S03, p. 4, AN 92148427 & SU,A 1,374,922 (As Sibe Bio–Phys) 30 Jul. 1991.

Applied Optics, vol. 20, No. 15, 1 Aug., 1981, New York, U.S., pp. 2656–2664, P. A. Temple, "Total Internal Reflection Microscopy: A Surface Inspection Technique".

"Standing–Wave Fluorescence Microscopy" by Frederick Lanni, *Applications of Fluorescence in the Biomedical Sciences*, D. L. Taylor, A. S. Waggoner, R. F. Murphy, F. Lanni and R. R. Birge, eds., Alan R. Liss, Inc., New York, New York,1986, pp. 505–521.

F. Lanni "Feedback–stabilized focal plane control for light microscopes", Rev. Sci. Instrum. 64 (6), pp. 1474–1477, Jun., 1993.

Gustafsson et al., Sevenfold improvement of axial resolution in 3D widefield microscopy using two objective lens, Sep. 1995, SPIE vol. 2412, pp. 147–156.

*Primary Examiner*—Thong Nguyen
*Attorney, Agent, or Firm*—Kirkpatrick & Lockhart LLP

[57] ABSTRACT

In an improved optical microscope for observing a luminescent specimen, the specimen is excited by a single, on axis or multiple superposed series of standing wave fields. Then an image of the specimen is recorded and displayed. This specimen can be incrementally moved and additional images can be recorded and processed. Images of the specimen recorded when there are nodes or antinodes at the focal plane of the microscope can be combined by image processing to produce an improved image or set of images of the specimen. Also disclosed are improved standing wave microscopes having a phase conjugator, a transmitted light source, feedback stabilization, an extended light source for field synthesis or a beam contractor. A multiple wavelength light source can be used to view a specimen marked with multiple luminescent dyes.

20 Claims, 15 Drawing Sheets

NODAL

ANTINODAL

DIFFERENCE

FIELD SYNTHESIS AND OPTICAL SUBSECTIONING FOR STANDING WAVE MICROSCOPY

CROSS REFERENCE TO RELATED APPLICATION

This is a continuation-in-part of our U.S. patent application Ser. No. 08/014,328, filed Feb. 5, 1993 now U.S. Pat. No. 5,394,268.

BACKGROUND OF THE INVENTION

The invention relates to luminescence optical microscopy and particularly to an apparatus and method for selectively optically exciting luminescence in particular zones in a specimen such as a biological cell or tissue.

FIELD OF INVENTION

Optical microscopy using fluorescence tagging for the determination of three-dimensional structure of cells and tissues is an important diagnostic and research procedure. There are a great number of dyes which can be attached to various structures within the cell. When excited by a particular wavelength of light these dyes will fluoresce or phosphoresce. For example, several common dyes will emit a red glow when excited by green light. Hence, one can see structures to which a fluorescent dye is attached. The presence and location of the tagged structures can provide important diagnostic and structural information for basic research and clinical diagnostics.

Fluorescence imaging, in particular, is of vast utility in cell biology because of the high specificity of fluorescently labeled protein analogs, antibodies, hybridization probes, enzyme substrates, lipid analogs, and peptides, as well as stains. Fluorescence micrographs of extremely complicated objects such as intact cells typically show clearly the distribution of the tracer molecules, all other components being "invisible". The important optical characteristics of many biological specimens that allow for this simple interpretation of the image field is that cells are generally weakly refractive and weakly absorptive objects.

Conventional microscope images contain information about the 3-D structure of the object when the depth of field of the lens system is smaller than the axial dimension of the specimen. This means that in a single image, the axial location of a particular feature is encoded by its degree of defocus. A 3-D image data set, which is a "zero-order" estimate of the true structure of the object, is obtained by recording a series of images as the object is stepped through the focal plane of the microscope, a procedure known as optical sectioning microscopy (OSM). Each image is a spatially filtered axial projection of the object, and each generally contains in-focus and out-of-focus features. One of the central problems in 3-D microscopy is the removal of out-of-focus features from the 3-D image by optical and image processing methods thereby deriving a refined estimate of the true object.

In fluorescence microscopy there is a linear relationship between the emitter distribution in the object and the intensity distribution in the image field. This is caused by the mutual incoherence of fluorescence emission. Dye molecules in the specimen radiate independently so that the individual intensity fields are simply superimposed in the image plane. It is possible to deconvolve the 3-D image to attenuate the out-of-focus portions. However, for the various methods that have been proposed there is a trade-off of recovery of high-resolution structure for accuracy or stability.

The alternative to computational refinement of optical sectioning image data is confocal scanning fluorescence microscopy (CSFM) in which direct optical spatial filtering is used to remove out-of-focus light waves from the detector field. In one version of this type of instrument fluorescence is excited in the specimen by a highly focused beam. In the image plane of the microscope a pin hole is placed at the point optically conjugate to the focal point of the beam and a high gain, low noise detector is placed behind the pin hole. The microscope acts as a spatial filter that detects efficiently only fluorescence photons that originate near the beam focus. 3-D image data is obtained by raster scanning of the beam relative to the specimen, either optically or mechanically, and stepping the specimen axially through the focal plane to get stacked images. Confocal methods have several shortcomings. For example, such images often have a low signal to noise ratio. Hence, the resolution of the image is often severely compromised. Also, scanning usually is relatively slow, with scan times up to 64 seconds per frame for high signal-to-noise images. Indeed, there are many circumstances in which this technique cannot be utilized.

For fundamental reasons, a fluorescence microscope is more severely limited in axial (depth, or inter-image plane) resolution, as opposed to transverse (in the image plane) resolution. Consider a microscope with a lens having a high numerical aperture (NA) and a specimen of refractive index $n$ illuminated by a light beam having a wavelength $\lambda$. The well-known Rayleigh resolution formula, $0.61\lambda/(NA)$, sets transverse resolution at about 0.2 μm via direct imaging. This can be halved, in principle, by confocal scanning. In comparison, the axial equivalent of the Rayleigh formula, $2n\lambda/(NA)^2$, is in the range 0.7–0.9 μm, typical for high-quality fluorescence OSM image sets. Computational image processing or confocal scanning can reduce this to 0.4–0.5 μm. A more restrictive analysis, the Rayleigh quarter-wave criterion, $\lambda/8n \sin^2(\frac{1}{2}\sin^{-1} NA/n)$, gives a theoretical axial resolution in the range 0.13–0.17 μm for the best microscope lenses. This has been demonstrated in transmitted light microscopy, but not in fluorescence, due to the lack of mutual coherence in fluorescence imaging, and the generally lower signal-to-noise level. Therefore when the specimen contains fine stratified structural features, or simply when it is thinner than the depth-of-field, fluorescence OSM or even CSFM is unable to yield significant 3D information.

U.S. Pat. No. 4,621,911 discloses a method and apparatus called standing wave luminescence or fluorescence microscopy (SWFM) in which a specimen is illuminated in a fluorescence microscope by means of a standing wave field at the excitation wavelength. This field is preferably produced by crossing two equal amplitude coherent beams from a laser. The direction of the beams is such that the nodal and anti-nodal planes in this field are parallel to the object plane of the microscope. Under this condition fluorescence is excited in laminar zones in the specimen, maximally at the location of each anti-nodal plane. One of these planes can be made coincident with the in-focus plane. In this way in-focus features of the specimen are made brightly fluorescent. Immediately adjacent features above and below the in focus plane are in nodal zones and are, therefore, only weakly fluorescent.

U.S. Pat. No. 4,621,911 teaches a theory and embodiments for creation and manipulation of a periodic standing wave field superimposed with the specimen in a fluorescence microscope, and that sets of images obtained by standing wave excitation contain Fourier coefficient information on the axial (depth) structure of the object down to an axial resolution limit of λ/4n, as small as 0.068 μm. The embodiments of the patent include several methods for producing a standing wave field by crossing two equal-amplitude collimated s-polarized coherent beams at complementary angles relative to the axis of the microscope. These embodiments include the use of total internal reflection (TIR), a mirror or prism, or a wavelength-selective high reflector to fold a laser beam in the specimen region of the microscope, independent coherent beams entering the specimen from opposite sides, or a re-entrant beam that first emerges from the objective lens into the specimen. The patent also includes embodiments where the nodal planes are not parallel to the object focal plane although the parallel condition is of principal interest here. Nevertheless, the method and apparatus of the '911 patent do not overcome the problems associated with the presence of out of focus luminescent portions in the image.

SUMMARY OF THE INVENTION

We provide improved methods and apparatus which overcome the out of focus problems and clearly display the transverse and axial position of luminescent structures in the specimen. As in the apparatus of U.S. Pat. No. 4,621,911, a fluorescence microscope is equipped with an optical system for standing wave excitation of the specimen. In a first present preferred method we manipulate a single standing wave field to show the axial structure of a specimen, even when the specimen is so thin that it is entirely within the depth-of-field of a high resolution microscope. We call this extension optical subsectioning, and have found a practical axial resolution limit of λ/8n (approximately 0.05 μm) in thin specimens. In a second present preferred embodiment a nonperiodic excitation field is generated in the specimen such that the excitation intensity is peaked only at the object focal plane. In this case, intersecting beams entering the specimen from opposite sides are swept in angle (or multiple sets of such beam pairs are superposed) to generate a continuous series of standing wave fields that differ in node spacing, but all with an antinode at the object focal plane. A single image is recorded with the swept or multiple-beam excitation, with the net result being the preferential excitation of structures in the specimen that lie in the in-focus plane. This differs from the method of the '911 patent in that the net excitation field is peaked only at the in-focus plane, and not at evenly-spaced antinodal planes. We call this method excitation field synthesis (EFS) or field synthesis fluorescence microscopy (FSFM). It represents an extension of standing wave microscopy theory and practice to the high-aperture limit, where the depth-of-field of the optics is less than the axial dimension of the specimen.

In our method and apparatus we direct two beams, which can be a single beam reflected back through a specimen, to create distinct nodes and anti-nodes such as is taught in U.S. Pat. No. 4,621,911. We prefer to direct the beams through the lens of the microscope. In one embodiment the beam reflects directly back from a mirror positioned underneath the specimen. Alternatively, we use an active phase conjugator to generate the return or re-entrant beam in a standing wave illuminator. The phase conjugator generates the time-reversed version of the excitation beam that first passes through the specimen, so that a standing wave field of high spatial modulation is created, even in specimens where the incoming planar wavefronts have been aberrated due to refractive index inhomogeneties. In another embodiment we use a beam splitter to create two beams from a single light source. The two beams preferably are directed to enter the specimen from opposite sides.

The microscope can be configured to have two objective lenses. In this configuration, transmitted-light optics can be incorporated into the microscope along with the fluorescence optics. One objective then functions as a transmitted light condenser.

In another embodiment multiple wave-length illumination is used for a specimen marked with two or more dyes that respond to different wavelengths of impinging light.

We also prefer to provide a compact interferometer to detect fringe displacement and generate a signal to adjust the phase of one or both beams to compensate for drift.

Using any of the embodiments of our microscope the specimen is illuminated in a manner previously discussed and an image of the specimen is recorded in a camera and stored. Then the specimen is moved a selected axial distance. Again the specimen is illuminated and a second image is created and stored. This process can be continued until a desired number of images of the specimen are created. These images are then combined by image processing to produce one or more combined images of the specimen.

A fully interferometric embodiment of the microscope is also described in which an extended light source, such as a lamp, having limited coherence, is used. This allows for simultaneous generation and superposition of standing wave fields, and syntheses of a nonperiodic, peaked field.

Other objects and advantages of the invention will become apparent from a description of the preferred embodiments shown in the figures.

PRINCIPLES OF OPERATION

Figure 1:
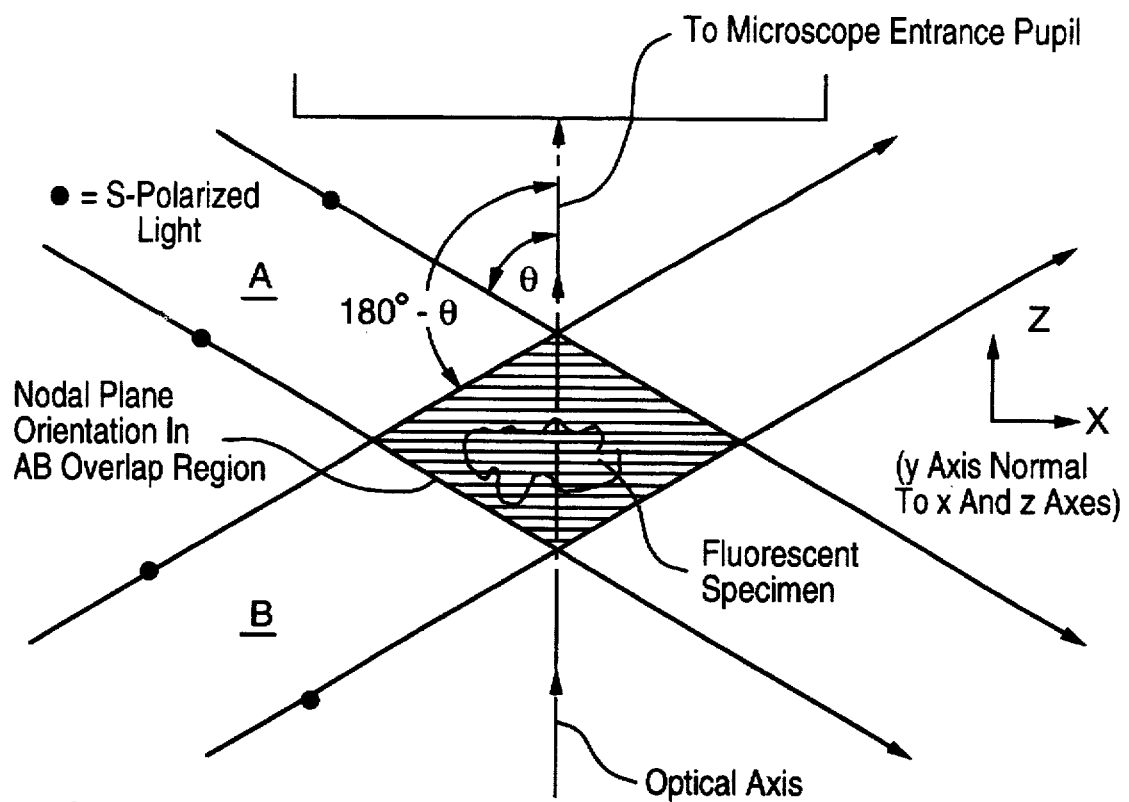
FIG. 1 is a schematic representation of the standing wave illumination of the prior art wherein a specimen is in a standing wave field of s-polarized light and on the optical axis of a microscope.

In a standing-wave microscope, two plane-wave fields from a laser are crossed at complementary angles in the specimen volume, where they interfere (FIG. 1). When the two fields are s-polarized and of equal amplitude, the resulting interference pattern has an electric field intensity that varies only axially, as $$I_{ex}(z) = I_o[1 + \cos(Kz + \Phi)]$$

where $K = (4\pi n/\lambda) \cos\theta$, $\lambda$ is the wavelength and n is the specimen refractive index. Fluorescence is excited in the specimen in proportion to $I_{ex}(z)$. The nodes or antinodes of the field, which are planes parallel to the focal plane, have a spacing $\Delta s = \lambda/2n \cos\theta$. By controlling the angle $\theta$, the node spacing can be varied down to a minimum value of $\lambda/2n$, when the two beams are counterpropagating along the axis of the microscope. By shifting the phase of one of the beams, the relative position of the field planes within the specimen can be changed, at constant node spacing.

It is straightforward to estimate the axial resolution in SWFM. Two particles which are separated axially by half the node spacing can be illuminated alternately by shifting the phase of the standing wave pattern. With blue light excitation and a specimen refractive index of 1.33 (water) or higher, $\lambda/4n$ is 0.09 µm or less. In practice, it has been possible to resolve particles separated axially by a quarter fringe (0.045 µm) in specimens where there is little overlapping structure. Because these distances are considerably less than the depth-of-field normally obtained in fluorescence microscopy, "optical subsectioning" is possible. That is, in thin specimens that fall entirely within the depth-of-field of a high numerical aperture (NA) objective lens, axial structure can be observed purely by calibrated movement of an antinodal or nodal plane through the specimen, with no mechanical refocusing required. Even when the specimen is thick, discrete outlying structure may be discriminated by degree of defocus from in-focus features, so that optical subsectioning will still be useful. In mathematical terms, standing wave excitation is equivalent to axial modulation of the point spread function (PSF) which in turn is equivalent to shifting the optical transfer function (OTF) axially in reciprocal space by a distance equal to the spatial frequency of the standing wave field. This permits recovery of spatial frequency information that is absent or very heavily attenuated under incoherent excitation in conventional optical systems.

Optical subsectioning is a subtractive process in which a single standing wave field is manipulated to resolve the relative axial position of two or more stratified structures in a thin fluorescently labeled specimen. A thin specimen is one which lies entirely within the depth-of-field of the microscope and, strictly, within one node period of the standing wave field, 0.17 µm under typical conditions. In practice, the phase of the field is adjusted so that a nodal plane is coincident with one stratum. The structural features of that stratum then fluoresce only weakly, and an image is recorded that shows primarily the structures in other strata, i.e., a subtractive image. The nodal plane is then moved by a known distance to null the fluorescence from a neighboring stratum, and a complementary image is then recorded. In the simplest case, two structures that overlap in a conventional fluorescence image will each appear distinctly in two standing wave images, where a nodal plane is located first at one structure, and then the other.

A standing-wave microscope is, in fact, a type of interferometer in which the dye molecules in the specimen act as the primary detectors of the excitation field. In our original design (FIG. 2), total internal reflection was utilized to fold a collimated laser beam at the specimen cover glass to form the periodic field, which made the use of a high numerical aperture (NA) immersion lens difficult. This problem is solved by use of low-divergence gaussian beams propagating within the aperture of a high-NA lens, giving maximum resolution and light collection efficiency. In the simplest configuration (FIGS. 4 and 5), the beam 21 emerges from the lens 8, passes through the specimen 2, and is back-reflected by a closely-apposed mirror 16. One could use a phase conjugator in place of a mirror 16. The mirror is moved axially by a piezoelectric drive 14, which causes an equal axial shift of the excitation field planes through the specimen. The optics are adjusted so that the gaussian beam exiting the objective 8 contracts slightly to a large-diameter waist (150 µm) at the mirror, 0.1–0.2 µm beyond the specimen. The standing wave field is then due to the superposition of the gaussian field and its reflection. In this condition, the nodal surfaces of the unperturbed standing wave field, although curved in principle, are flat to better than 1 part 20,000 over the field of view. Therefore, these surfaces are called nodal planes. Nodal planes are always parallel to the mirror in this system.

Figure 7:
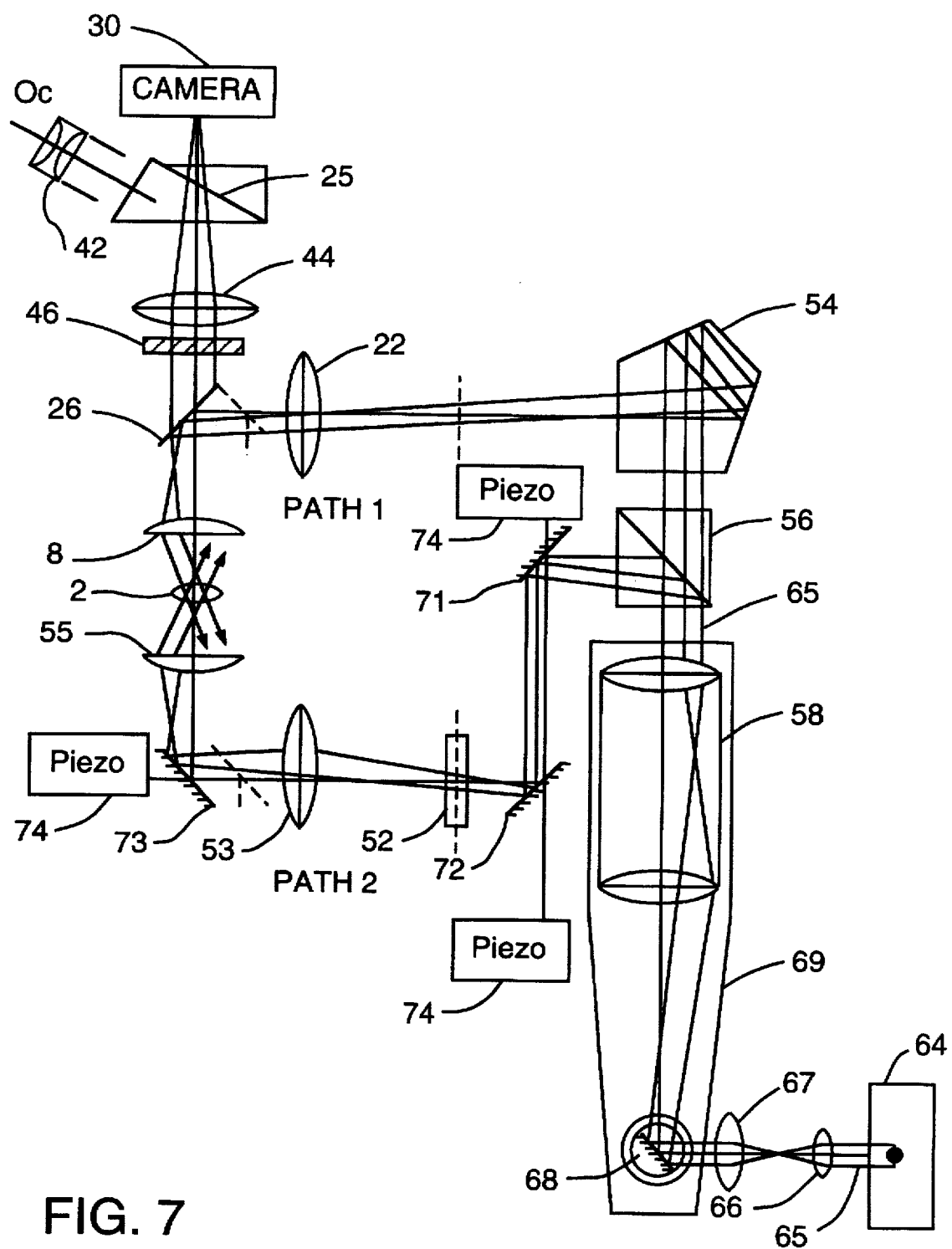
FIG. 7 is a schematic diagram of the second preferred embodiment of our microscope.

A more versatile optical system having a laser 64 for a light source was also designed, with objective lenses 8 and 55 positioned on opposite sides of the specimen (FIG. 7). A prism splitter 56 is used to amplitude-divide the expanded beam, so that a low divergence gaussian enters the specimen 2 independently from each side. Since the coherence length of a 1 m ion laser is as short as 30 mm, the two beam paths in the microscope are typically matched to within 5 mm. A piezoelectric drive 74 on a mirror 71, 72 or 73 in one beam path serves to adjust the phase, in this case mirror movement being a full wavelength per cycle of the standing wave field. One advantage of the two beam system is that unaberrated wavefronts enter the specimen on both sides, compared to the mirror system where phase errors accumulate on both passes when the specimen refractive index is heterogeneous. The second advantage of this configuration is that by sweeping the beam angle ($\theta$) in the specimen, standing wave fields of different spatial period can be time-multiplexed in the specimen during the acquisition of a single image. The advantage of this is described below.

The two-beam system provides the means for excitation field synthesis (EFS). The microscope operates like an OSM system, in that fluorescence images of the specimen are recorded in an electronic camera as the specimen is stepped through the focal plane. It differs from OSM in that for each image, the specimen will be excited by a continuous sequence of standing wave fields that differ in axial node spacing, but all with an antinode located at the focal plane of the microscope. The sequence of fields is generated by sweeping the beam crossing angle during excitation of the specimen. For every field in the sequence, fluorescence will be excited maximally at the focal plane. Away from this plane, the phases of each field differ, so that the excitation intensity averaged over all fields in the sequence will be less. Optionally, a second fluorescence image can then be recorded with the same sequence of standing wave fields, except that each is adjusted to have a node at the focal plane. In this case, fluorescence will be excited minimally at the focal plane, but at similar averaged levels away from it. Digital pixel-by-pixel subtraction of the nodal image from the antinodal image gives a result for which the effective excitation field is peaked at the geometric focal plane, but decays to zero above and below this plane.

In practice, the sequence of standing wave fields can be generated by sweeping the beam-crossing angle θ through the full range accessible within the aperture of the objective lens and condenser. For a water-immersion system having a numerical aperture of 1.2, for example, the range is ±64°. The synthesized field for the antinodal image will then be $$I_{EFS}(z) = \int_{-\theta_m}^{\theta_m} \frac{1}{2}\{1+\cos[K_0 z \cos\theta]\}d\theta$$

$$= \theta_m(1+J_0(K_0 z)) + \sum_{p=1}^{\infty}(-1)^p \frac{\sin 2p\theta_m}{p} J_{2p}(K_0 z)$$

$$= 1.12(1+J_0(K_0 z)) - 0.78 J_2(K_0 z) - 0.49 J_4(K_0 z) -$$
$$0.15 J_6(K_0 z) + 0.10 J_8(K_0 z) + 0.19 J_{10}(K_0 z) +$$
$$0.13 J_{12}(K_0 z) + 0.01 J_{14}(K_0 z) + \ldots$$

where $K_0 = 4\pi n/\lambda$. For the nodal image, only the constant term does not change sign, so that the difference image is weighted by the sum of the Bessel terms. This sum is peaked at the focal plane, and decays to zero in an oscillatory manner above and below it (FIG. 8). For an idealized optical system in which the numerical aperture is equal to the specimen refractive index (NA=n, $\theta_m$=90°), the weighing of the difference image is simply $J_0(K_0 z)$.

The effect of field synthesis on the OTF can be illustrated directly. Fourier transformation of the above equation gives $$I_{EFS}(k_z) = \begin{cases} 2\pi\theta_m \delta(k_z), & |k_z| < K_0 \cos\theta_m \\ \pi/\sqrt{K_0^2 - k_z^2} & K_0 \cos\theta_m < |k_z| < K_0 \\ 0 & |k_z| > K_0 \end{cases}$$

which is a piecewise discontinuous function of axial spatial frequency. $I_{EFS}(k_z)$ is convolved with the OSM OTF to give the EFS OTF. Therefore, it can be seen that for an EFS system operating within the aperture of existing high-NA objective lenses, the OSM OTF gets expanded piecewise into an extended axial spatial frequency band. The EFS OTF has the same transverse limit as in OSM, but is significantly extended axially. Purely axial wave vectors with frequencies in the range of $K_0 \cos\theta_m$ to $K_0$ are recovered directly, and the bandpass limit extends beyond this for near-axial wave vectors.

DESCRIPTION OF THE PREFERRED EMBODIMENTS

The present invention utilizes intersecting beams to create a standing wave pattern. Several methods for creating such a pattern are described in U.S. Pat. No. 4,621,911. FIG. 1, which was taken from that patent, shows the intersection at a fluorescent or phosphorescent specimen of two coherent, collimated, monochromatic beams of light, A and B, of a wavelength suitable for excitation of fluorescence or phosphorescence in the specimen. Rays A represent the propagation of a collimated beam (plane waves) that makes an angle θ with the optical axis of the microscope. Rays B represent the propagation of a second collimated beam that makes an angle 180°−θ with the optical axis, and is coplanar with A and the optical axis.

Figure 2:
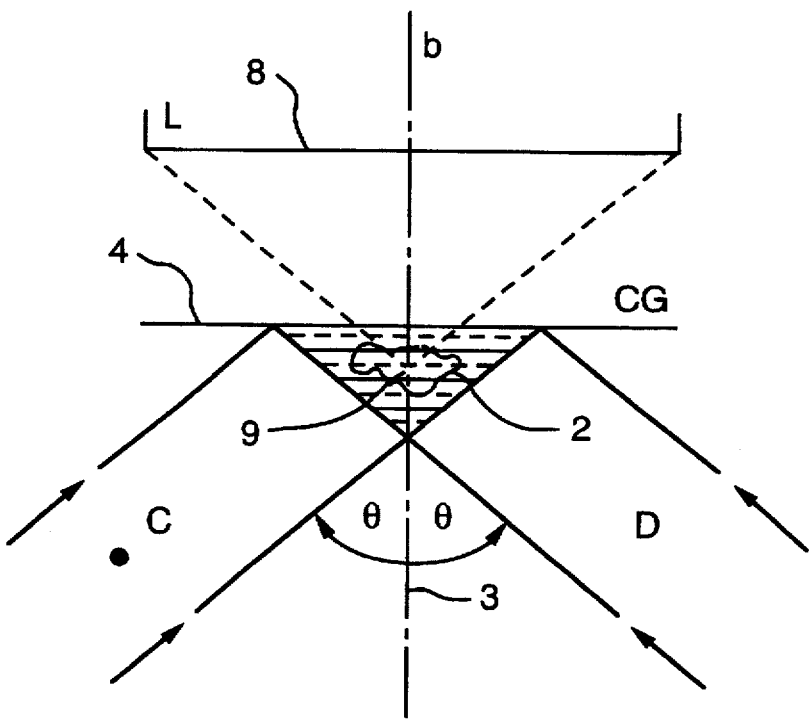
FIG. 2 is a schematic representation illustrating the formation of a standing wave field by total internal reflection of an incident beam from a cover glass.

It is also possible to create a standing wave pattern using reflection so that the reflected beam intersects the incident beam. This technique is illustrated in FIG. 2. A sufficiently coherent light source (not shown) directs a collimated beam C which passes through the specimen 2. That beam strikes the cover glass 4 and is reflected as collimated beam D. Since beams C and D are s-polarized and intersect, a standing wave pattern 5, indicated by dotted lines, is formed. The microscope lens 8 is positioned so that its focal point 9 in focal plane 10 is within the standing wave pattern in the specimen.

When both beams A and B or C and D make the same angle θ with respect to the optical axis of the microscope, as shown in FIGS. 1 and 2, the antinodal and nodal planes of the standing waves are parallel to the focal plane. Therefore, fluorescence will be excited in the specimen in laminar zones that show the axial structure of the object. This can be most clearly seen in FIG. 3.

Figure 3:
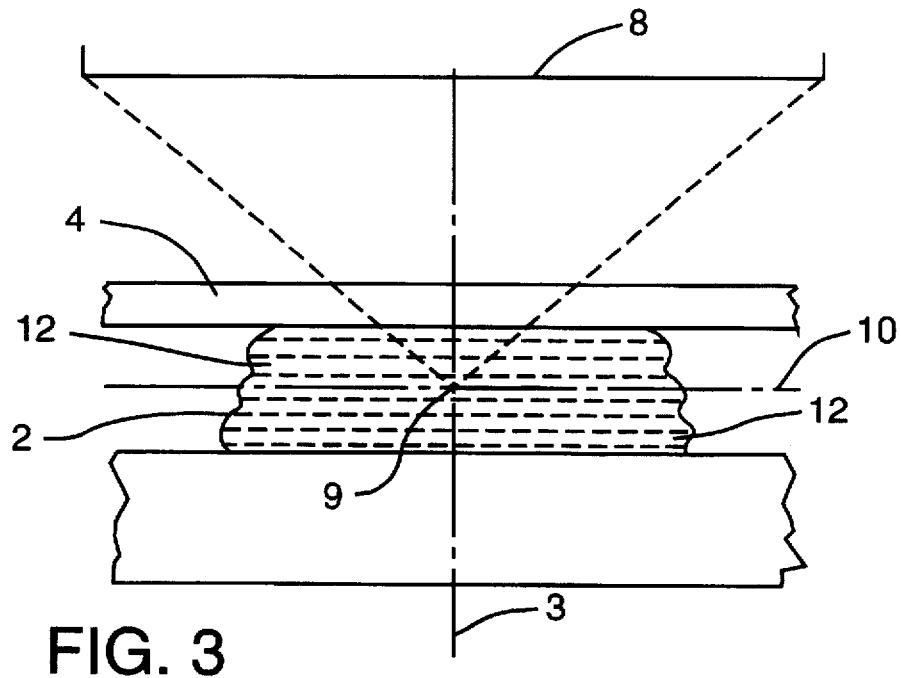
FIG. 3 is a side view of a specimen placed in the object focal plane of a microscope.
Figure 5:
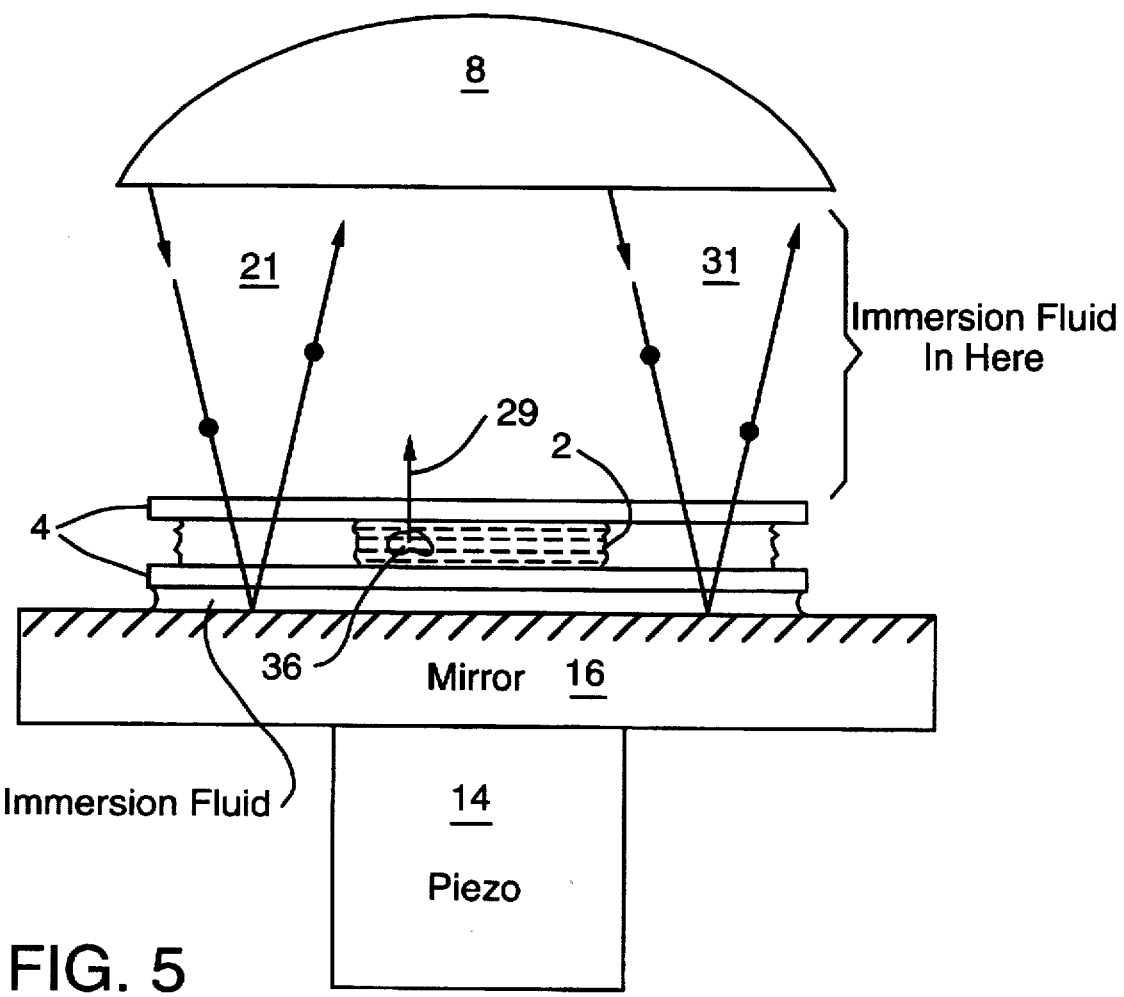
FIG. 5 is an enlarged view of the specimen being illuminated in the microscope of FIG. 4.

A side view of the specimen 2 mounted on a glass slide 6 is shown in FIG. 3. The specimen 2 is under a cover glass 4. The microscope lens 8 is positioned so that the object focal plane 10 is within the specimen 2. If the specimen is illuminated in the manner shown in FIGS. 1 or 2 a series of laminar zones 12 will be created within the specimen. The node spacing (ΔS) of the excitation field varies with changes in the wavelength (λ) of the beam and its angle (θ) relative to the optical axis 3. That is, (ΔS) =λ/2n cos θ which is a minimum of λ/2n at θ=0°. The relative position of the nodes and the specimen can be varied at constant node spacing by shifting the phase of one of the beams. In practice, total internal reflection was utilized to fold one beam at the cover glass 4 so as to set up a standing wave as shown in FIG. 2. In the method of FIG. 5, θ is limited by the lens system to a maximum value of $\theta_m=\sin^{-1} NA/n'$. In the system of FIG. 2, θ is limited by a minimum value equal to the critical angle at the cover glass 4.

Figure 4:
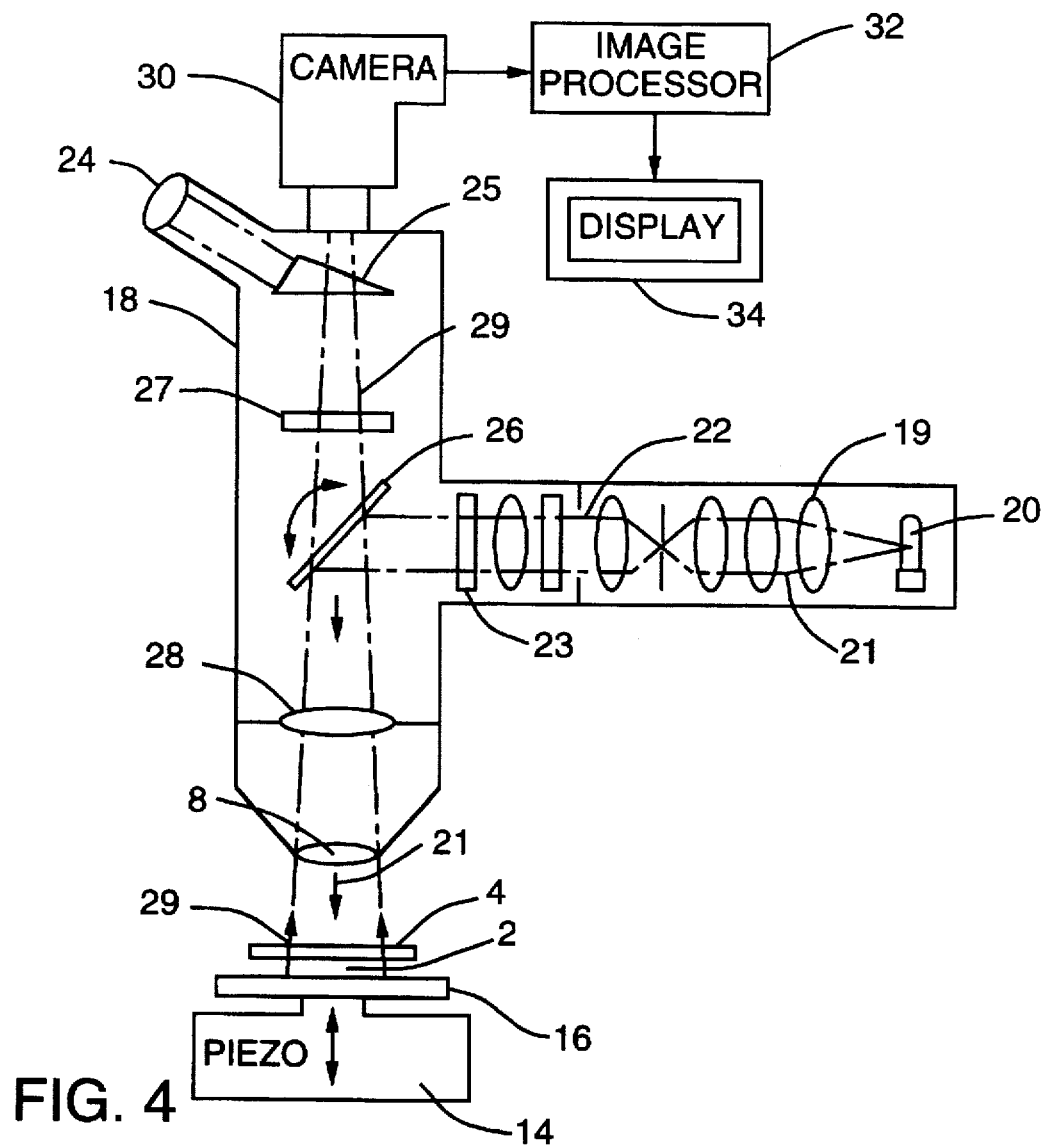
FIG. 4 is a diagram showing a first present preferred embodiment of our improved standing wave microscope.

Many cells can be tagged with a dye that is excited by green light to fluoresce red; so we can use a green laser for our light source. For other dyes we may also use blue, red, yellow and even ultraviolet lasers. As shown in FIG. 4 it is also possible to use an incoherent light source 20 such as a high pressure mercury lamp with a beam collimator 19, polarizer 22 and bandpass excitation filter 23. For the microscope 18 shown in FIG. 4 the imaging system is comprised of lenses 8 and 28, dichroic reflector 26, emission filter 27, beam splitter 25, eyepiece 24, camera 30, image processor 32 and display 34. Light source 20 emits a light beam 21 which is expanded collimated and s-polarized. Then the beam is reflected by dichroic reflector 26. Green light passes through lenses 28 and 8, cover glass 4 and specimen 2 until it is reflected by mirror or phase conjugator 16. This causes a standing wave pattern shown in FIG. 5 to be created in the specimen. The incident and reflected green light beams also cause luminescent tags within the specimen to emit red light 29. Emitted red light passes from the specimen through lenses 8 and 28 and through dichroic filter 26 and emission filter 27 and is directed by beam splitter or reflector 25 to eyepiece 24 or camera 30 or both. The optics are adjusted so that a gaussian beam 21 exiting the objective 8 contracts slightly to a large-diameter waist (150 μm) at the reflective surface 17 of the mirror 16 which is preferably 0.1–0.2 mm beyond the specimen 2. The standing wave field is then created by the superposition of the gaussian field and its reflection. In this condition, the nodal surfaces of the unperturbed standing wave field, although curved in principle, are flat to better than 1 part in 20,000 over the field of view. An electronic camera 30 with image processor 32 and display 34 records and displays an image. The display could be a cathode ray tube or film.

In many circumstances specimens can be tagged with two or more fluorescent dyes which are excited by different wavelengths of light. The microscope of FIG. 4 can be used for specimens marked in this manner. The wavelength could be changed with a filter or by adjusting or switching lasers.

Figure 6:
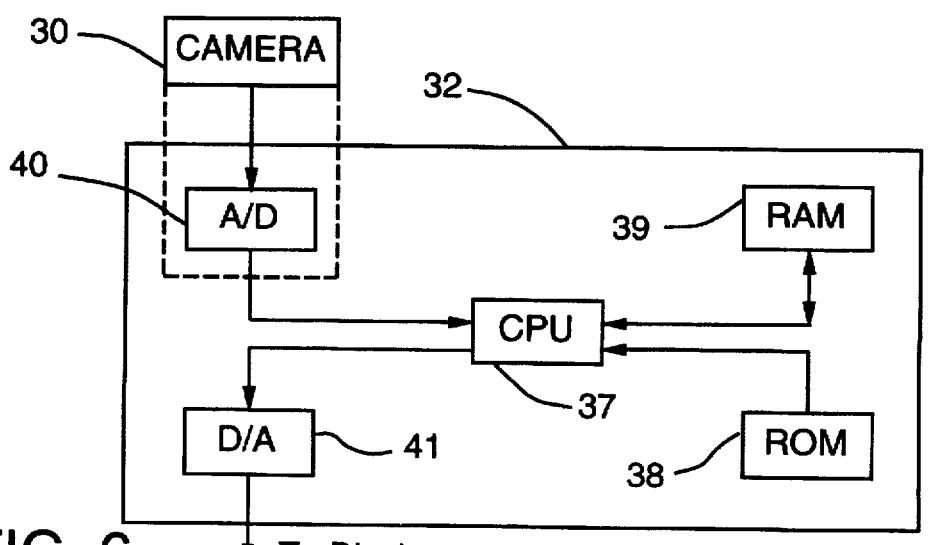
FIG. 6 is a block diagram of a image processor used with the microscope of FIG. 4.

The image which is created from the emission of light 29 by the luminescent tag 36 can be enhanced using known image processing technology. That image can be further improved using the methods described herein. Therefore, the image processor 32 should include a central processing unit 37, read only memory 38, and a random access memory 39 as indicated by FIG. 6. Normally, the image will be digitized using an A/D converter 40 in the image processor 32 or in the camera 30. The digital image is enhanced by the central processing unit 37 according to a program in memory 38. Both the original and enhanced images can be stored in memory 39. The enhanced image is converted to analog form by D/A converter 41 for display.

A more versatile optical system with objective lenses positioned on opposite sides of the specimen is diagrammed in FIG. 7. A laser emits a light beam 65 which passes through beam expander 66 and lens 67 to pivotable mirror 68 and a scan system 69 for field synthesis. The scan system 69 contains a movable scan mirror 68 and telescope 58. The beam 65 is split by beam splitter 56. A portion of the light is directed by mirrors 71, 72 and 73 through phase control 52, tube lens 53 and objective 55 through the specimen 2. A second portion of the beam is directed by prism 54, lens 22, dichroic reflector 26 and objective lens 8 through the specimen 2. Light 29 emitted from the specimen 2 passes to camera 30 or oculars 42 through lens 8, dichroic reflector 26, barrier filter 46 and tube lens 44. The beam splitter and prism are used to amplitude-divide the expanded gaussian beam, so that nearly flat wave fronts enter the specimen independently from each side. Since the coherence length of a 1 m laser is as short as 30 mm, the two beam paths in the microscope are matched to within 5 mm. A piezoelectric drive 74 can be provided on a mirror 71, 72, 73 or dichroic reflector 26 in one beam path to adjust the phase. In this case mirror movement is a full wavelength per cycle of the standing wave field. One advantage of the two beam system is that unaberrated wavefronts enter the specimen on both sides, compared to the mirror system of FIG. 5 where phase errors accumulate on both passes when the specimen refractive index is heterogeneous. The second advantage of the configuration of FIG. 7 is that by sweeping the beam angle (θ) in the specimen, such as by rotation of mirror 68, standing wave fields of different spatial period can be time-multiplexed in the specimen during acquisition of a single image. If this is done while keeping an antinode fixed at the object focal plane, sweeping provides a means for synthesizing a nonperiodic excitation field peaked at the in-focus plane of the specimen.

Figure 8A:
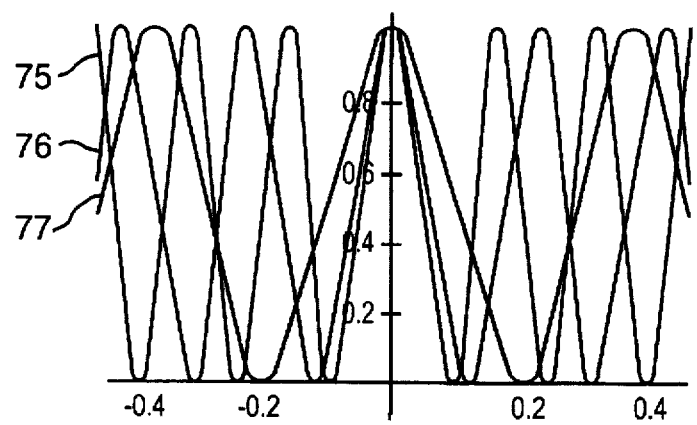
FIG. 8a, 8b, 8c, and 8d are graphs is a graph of overlapping standing wave fields having different nodal spacings.
Figure 8B:
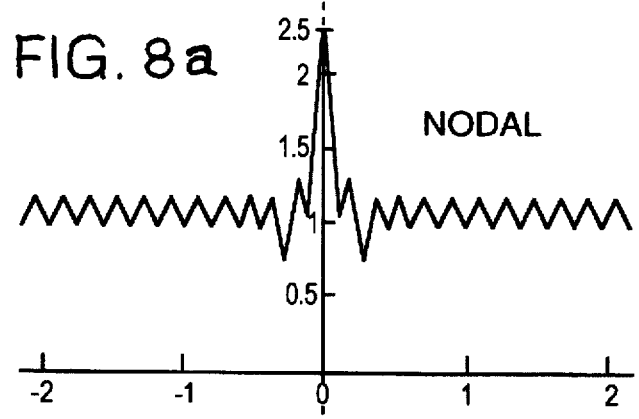
Figure 8C:
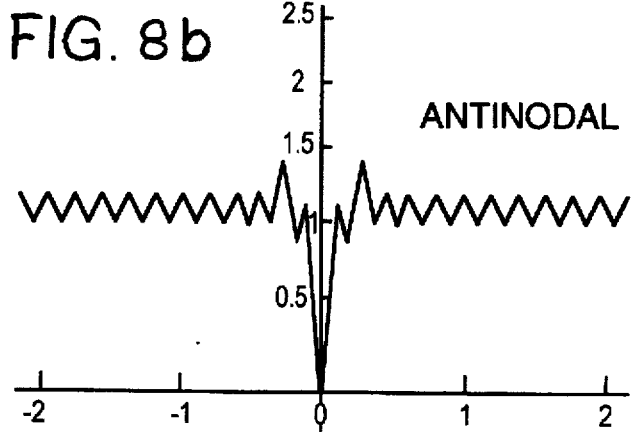

The devices shown in FIGS. 4 thru 7 are particularly useful for two methods of specimen imaging. In one method, the specimen 2 is excited by a time-multiplexed sequence of standing wave fields that differ in axial node spacing. This generates a set of wave patterns which if superimposed would look like the patterns shown in FIGS. 8b or 8c. Three waves 75, 76, and 77 are shown. By superimposing a set of standing wave fields having different node spacing, but all having an antinode at the focal plane in the specimen an effective field that is peaked at the focal plane can be synthesized, as shown in FIG. 8b.

Therefore, for every field in the sequence, fluorescence will be excited maximally at the focal plane. Away from this plane, the phases of each field differ, so that the excitation intensity averaged over all fields in the sequence will be less. Optionally, a second fluorescence image can then be recorded with the same sequence of standing wave fields, except that each is adjusted to have a node at the focal plane. In this case, fluorescence will be excited minimally at the focal plane, but at similar averaged levels away from it, as shown in FIG. 8b. Digital pixel-by-pixel subtraction of the nodal (FIG. 8c) image from the antinodal image (FIG. 8b) gives a result for which the effective excitation field is peaked at the geometric focal plane, but decays to zero above and below the plane as, shown in FIG. 8c. The sum of a series of curves, such as the curves 75, 76 and 77, in FIG. 8a, is shown in FIG. 6. In practice, the sequence of standing wave fields can be generated by sweeping the beam-crossing angle θ through the full range accessible within the aperture of the objective lens and condenser by use of scan mirror 68.

Figure 9:
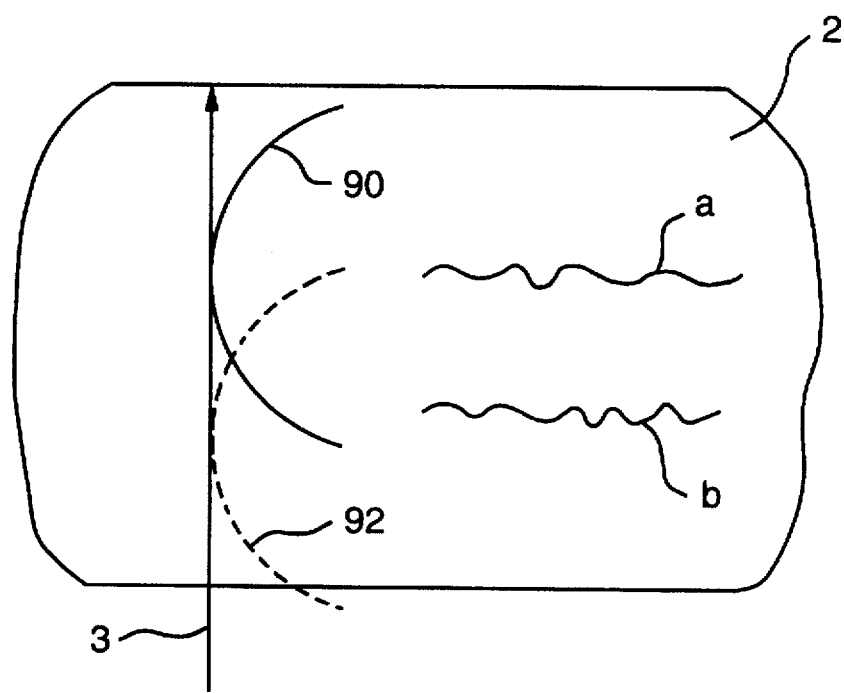
FIG. 9 is a graph illustrating movement of the nodal plane for optical subsectioning.

FIG. 9 illustrates the second method, optical subsectioning. A specimen 2 has tagged objects a and b. In the first case 90, a nodal plane is made coincident with object "a", so that the image will show the fluorescence of "b". In the second case 92, the node has been shifted to the axial location of "b", so that a second image will then show "a". The process can be easily extended to three or more close stratified objects, with the result that a series of images are obtained which contain linear combinations of contributions from each stratum. Linear digital processing can then be used to extract images corresponding to each stratum.

Two problems with standing wave fluorescence microscopy were immediately evident in our early work. First, the use of total reflection in the illuminator was convenient, but precluded the use of high-aperture immersion lenses. Second, as described, the standing wave data set consisted of a large number of images for each specimen focal plane position, since both θ and Φ could be varied. This made the method impractically slow. The present methods and apparatus of excitation field synthesis reduce the data set to one or two images per focal plane, by multiplexing different standing-wave fields.

With the beams counter propagating on axis (θ=0°), and an excitation wavelength of 514.5 nm, the node spacing in the specimen was determined to be equal to λ/2n in both the mirror and crossed beam systems. In the first case, mirror movement of 0.17 μm corresponds to a shift of one fringe. In the two beam system, external mirror movement of 0.514 μm had the same effect.

Figure 10:
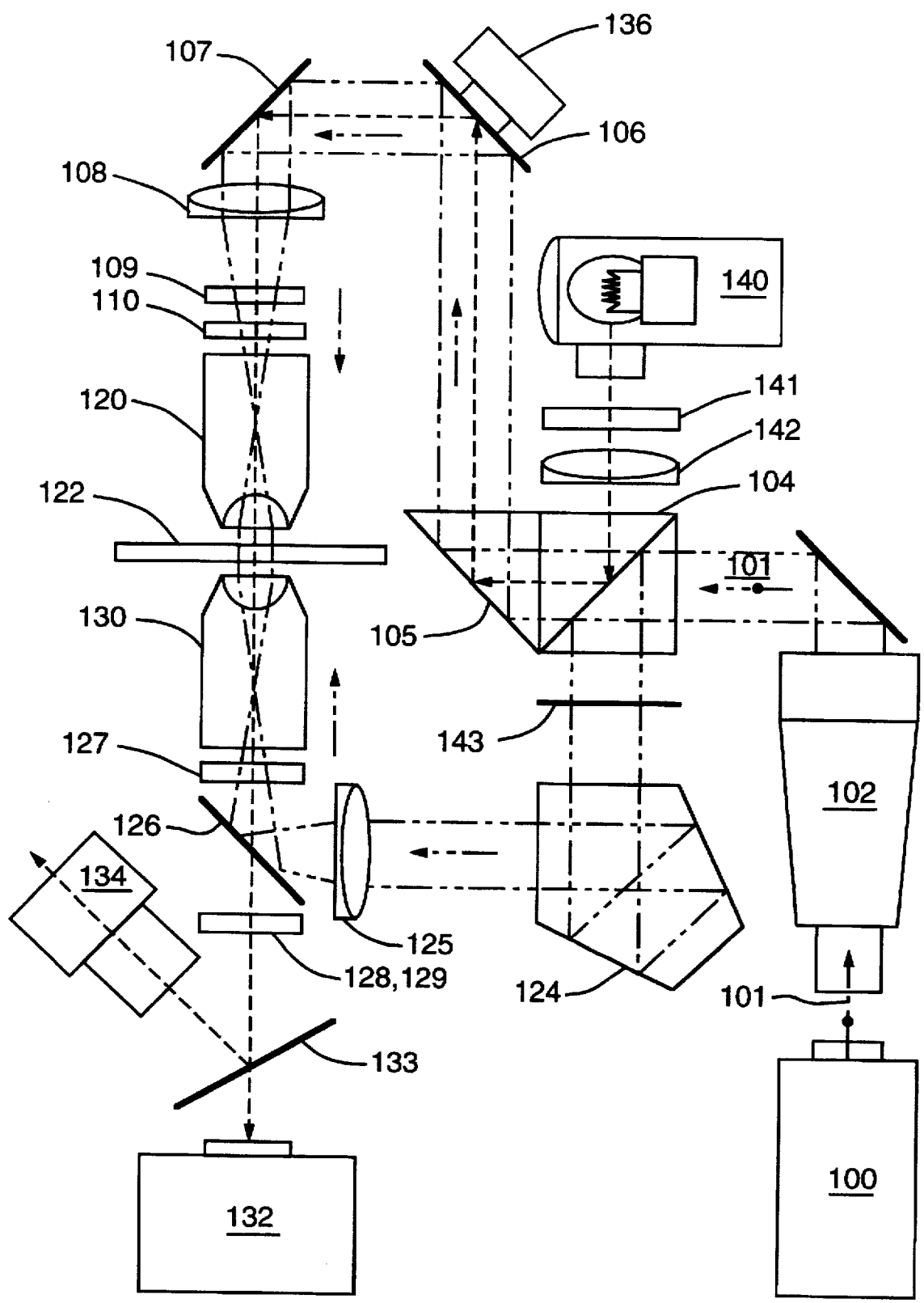
FIG. 10 is a schematic diagram of another preferred embodiment of our microscope which incorporates a transmitted light source in addition to an expanded laser beam.
Figure 11:
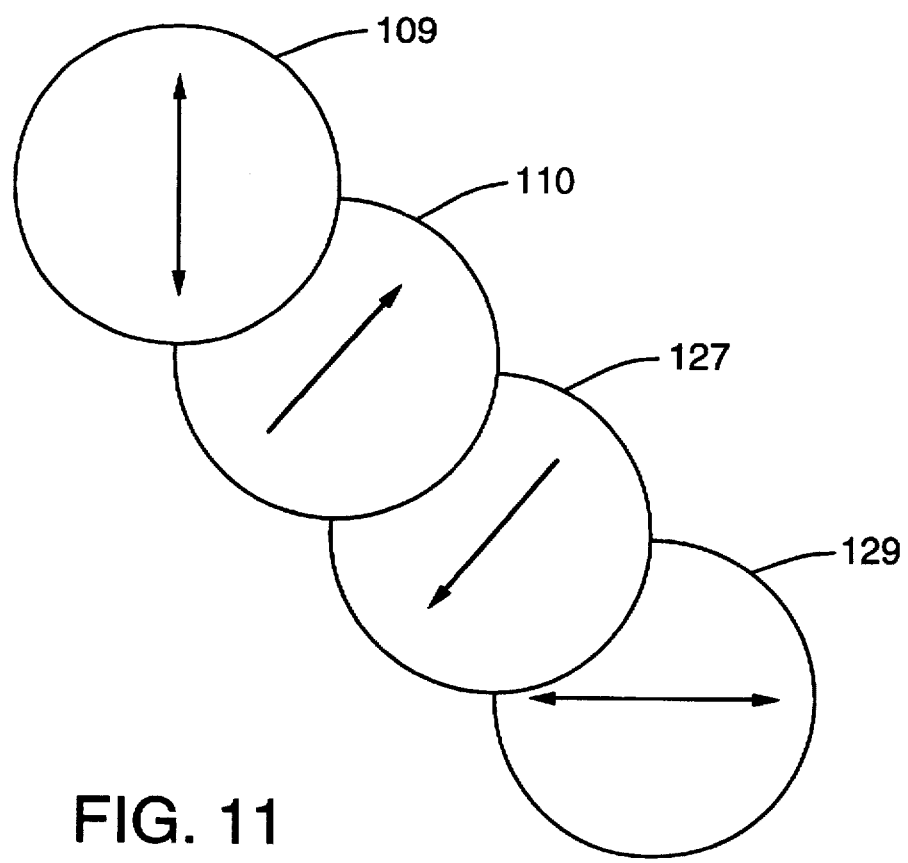
FIG. 11 is a diagram showing the preferred orientation for the transmitted light optics in the embodiment of FIG. 10.

FIGS. 10 and 11 illustrate an optical system which utilizes both a laser light source and transmitted light. This system has objective lenses 120 and 130 positioned on opposite sides of the specimen as diagramed in FIG. 7. For standing-wave microscopy, a laser 100 emits a light beam 101 which passes through beam expander 102. The beam 101 is split by beam splitting prism 104. A prism 105 adjacent to the beam splitter 104 and mirrors 106 and 107 direct a portion of the light through achromat lens 108, polarizer 109, upper Wollaston prism 110 and objective 120 through the specimen 122. A second portion is directed by beam splitter 104, penta-prism 124, achromat lens 125, dichroic reflector 126, lower Wollaston prism 127 and objective lens 130 through the specimen 122. For transmitted-light viewing of the specimen, light emitted from a conventional light source 140, such as an arc lamp passes through heat filter 141 and lens 142. Prisms 104 and 105, and mirrors 106 and 107 direct the light through achromat lens 108, polarizer 109, upper Wollaston prism 110 and objective 120 through the specimen 122. That light as well as fluorescence emitted from the specimen passes through objective lens 130, lower Wollaston prism 127, dichroic reflector 126 and analyzer 129 or fluorescence filter 128 to a camera 132 or eyepiece 134 depending upon the position of mirror 133. A shutter, 143 is closed when the transmitted-light optical system is in use, thus preventing light from lamp 140 from entering the microscope through lens 125.

As in the embodiment of FIG. 7, the beam splitter and prism are used to amplitude-divide the expanded gaussian beam so that nearly flat wave fronts enter the specimen 122 independently from each side. Since the coherence length of a 1 m ion laser is as short as 30 mm, the two beam paths in the microscope are matched to within 5 mm. A piezoelectric drive 136 can be provided on a mirror 106 or 107 to adjust the phase. In this case mirror movement is a full wavelength per cycle of the standing wave field. This system has all the advantages of the embodiment of FIG. 10. It also offers a non-laser light source which is useful for many applications.

In FIG. 11 the diagram shows the preferred orientation for the transmitted light optics in the standing wave microscope system of FIG. 10. As indicated by the arrows, the Wollaston prisms 110 and 127 are aligned and the polarizer 109 is normal to the analyzer 129.

Figure 12:
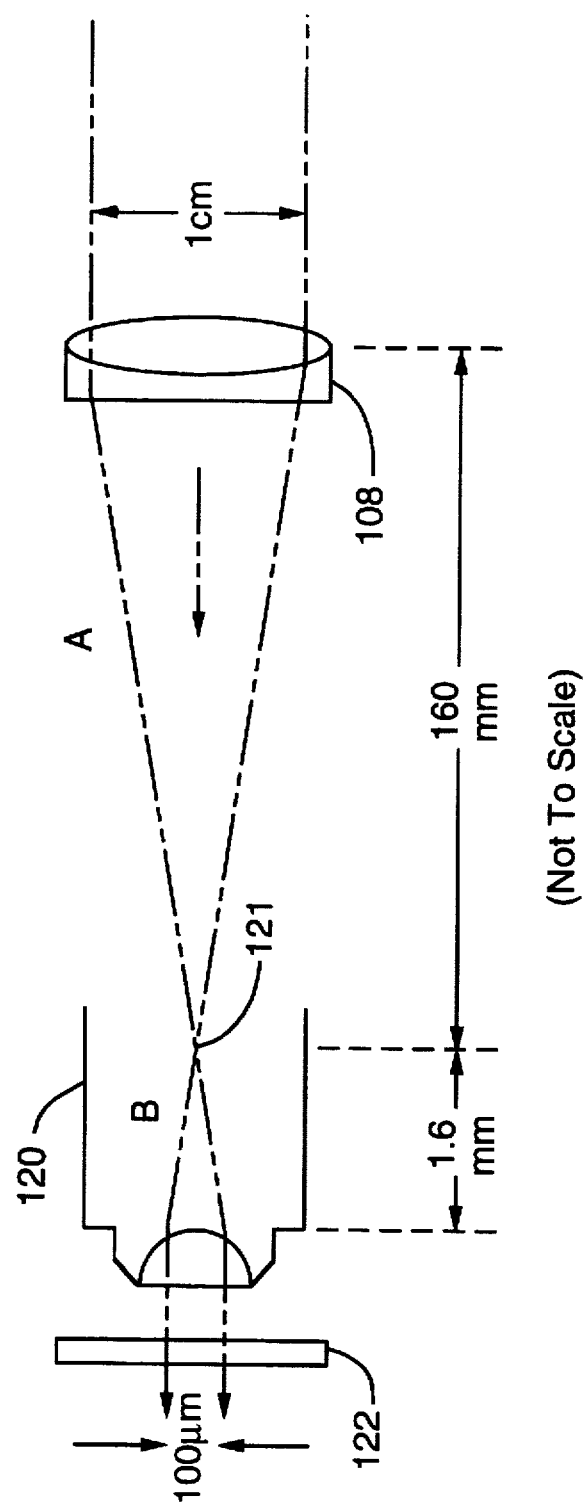
FIG. 12 is a diagram illustrating the operation of the achromat lens to create a contracted beam in the embodiments of FIGS. 7, 10 and 13.

FIG. 12 shows schematically how the microscope acts as a beam contractor thereby necessitating prior expansion of the laser beam in expander 102 in FIG. 10. The microscope of FIG. 7 operates in the same manner with lenses 22 and 53 in FIG. 7 being comparable to lens 108 in FIG. 12 and lenses 8 and 55 in FIG. 7 corresponding to lens 120 in FIG. 12. Lens 108 brings the expanded beam to a focus at the rear focal point 121 of objective 120. The beam, therefore, emerges from 120 as a nearly-collimated, contracted beam having a diameter equal to the microscope field of view. Because the standing wave microscope is a direct imaging microscope, the entire field of view is imaged simultaneously. Therefore, it is necessary that the illuminating beam diameter equal the field of view. With a Zeiss 100×1.25 NA oil objective the field of view is 100 microns and the rear focal length is about 1.6 mm. Using the fact that triangles A and B are similar the following relation is easily deduced expanded beam diameter/achromat focal length=contracted beam diameter/objective rear focal length.

In order to achieve a 100 micron illumination beam without using a beam expander, it would be necessary to use a 64 mm focal length achromat lens for a laser beam diameter of 4 mm. This is mechanically impossible within the constraints of existing microscope components. Therefore, the beam expander is used to provide a 1 cm expanded beam which the achromat lens 108 and the objective 120 together contract to the desired diameter.

Figure 13:
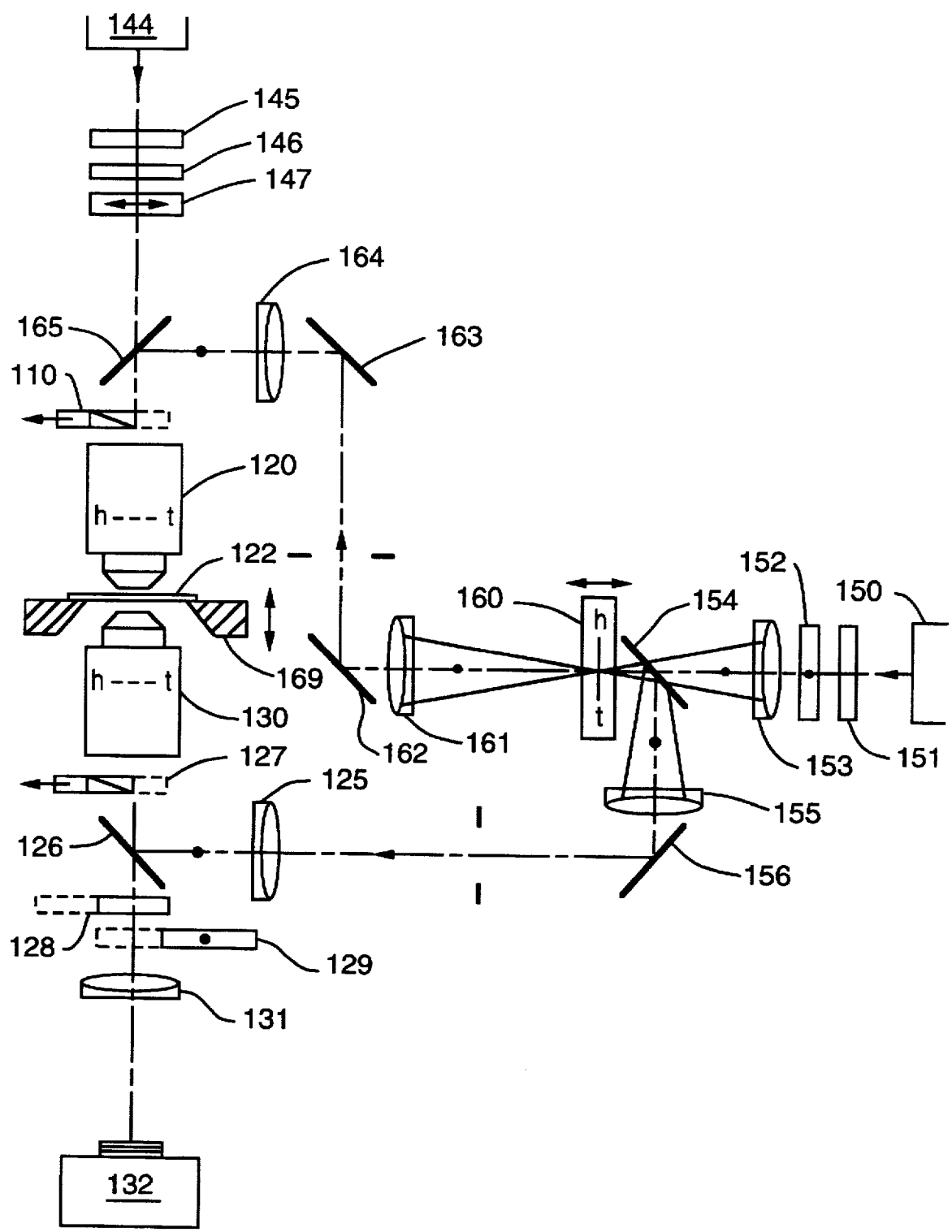
FIG. 13 is a schematic diagram of another preferred embodiment of our microscope which utilizes an extended light source for excitation field synthesis.

FIG. 13 shows another embodiment of our microscope having a fully interferometric standing-wave illuminator set-up in which the image of a narrow-bandwidth extended light source 150 (not necessarily a laser) is amplitude-divided on a beam splitter 160 and re-imaged in the rear focal plane of two corresponding microscope objectives 120, 130. The two optical paths between the splitter 160 and the specimen 122 must be balanced to well within the coherence length of the light source. For control of field plane position relative to the common-in-focus plane of the two objectives, the relative phase of the two beams is adjusted by submicron axial movement of beam splitter 160 as indicated by the double arrow adjacent the beam splitter 160 in FIG. 13. Because the source is extended, the illumination field at the specimen will consist of the superposition of mutually-incoherent standing-wave fields differing in node spacing, but all of which will have the same fringe offset at the in-focus plane. When the relative phase is zero (0 degrees) the net field in the specimen is peaked at the in-focus plane, dropping to half-peak intensity away from the in-focus plane. When the moveable beam splitter 160 is adjusted so that the relative phase is 180 degrees, the net field in the specimen is nulled at the in-focus plane, rising to half-peak intensity away from the in-focus plane. The 0/180 difference image (obtained by digital subtraction) will therefore show mainly fluorescent features located in a narrow zone about the in-focus plane. The extended light source can be a lamp, a scrambled laser, or a laser beam rapidly swept across the beam splitter 160 in a pattern.

In FIG. 13 light source 150 emits a light beam which passes through band pass filter 151, polarizing filter 152 and lens 153 through beam splitter 154 to beam splitter 160. Bandpass filter 151 provides monochromation of the broadband source and is not needed with a laser light source. Polarizing filter 152 is oriented to give s-polarization of the interfering light at the specimen. Lens 153 forms an image of the light source on the beam splitter 160. The orientation of the image on beam splitter 160 and elsewhere in the device is indicated by h - - - t. A portion of the light passes through moveable beam splitter 160, lens 161, mirrors 162 and 163, field lens 164, dichroic reflector 165, and objective lens 120 to specimen 122 on movable stage 169. Moveable beam splitter 160 is preferably 33% transmissive and 67% reflective. The portion of the light reflected from beam splitter 160 is partially reflected off beam splitter 154 through collimating lens 155. Beam splitter 154 is preferably 50% reflective, so that the light flux through lens 155 is then equal to that through lens 161. Light passing through lens 155 is directed to mirror 156, field lens 125, dichroic reflector 126, Wollaston prism 127 and lower objective 130 to specimen 122. Field lenses 125 and 164 each form an image of the light source and splitter 160 in the rear focal plane of the objectives 120 and 130. Fluorescence emitted from the specimen passes through lower objective 130, dichroic reflector 126, fluorescence emission filter 128, and body tube lens 131 to camera 132. The light source for transmitted light viewing 144 sends a light beam through bandpass filter 145, lens 146, polarizer 147, dichroic reflector 165, Wollaston prism 110 and objective 120 to specimen 122. The transmitted light optical system is completed by objective 130, Wollaston prism 127 and analyzer 129.

For fluorescence viewing we prefer not to use the polarizer 109, Wollaston prisms 110 and 127 and analyzer 129 of FIG. 10. Similarly, we prefer not to use Wollaston prisms 110 and 127 and analyzer 129 of the embodiment of FIG. 13 for fluorescence viewing. The ability to remove these components is indicated by the alternate positions shown in dotted line for these components in FIG. 13. Likewise, fluoresence filter 128 would be removed for transmitted light viewing.

Figure 14A:
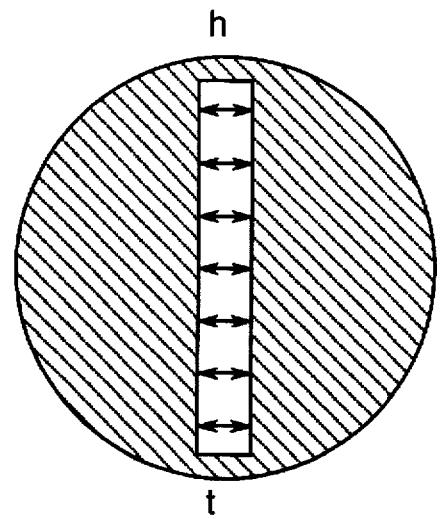
FIGS. 14a, 14b and 14c are diagrams showing orientation and polarization of the light source image on the main beam splitter used in the embodiment of FIG. 13.
Figure 14B:
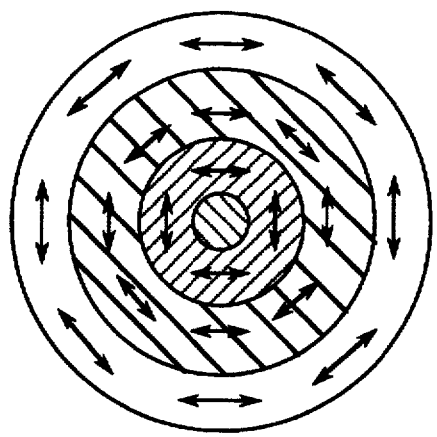
Figure 14C:
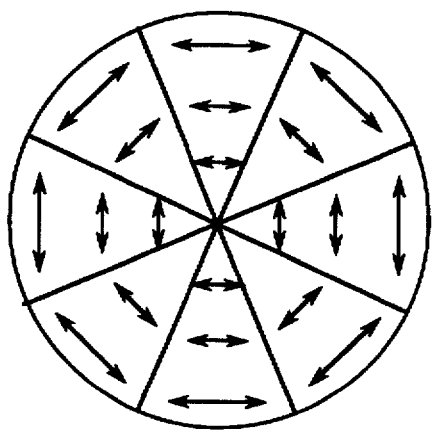
Figure 15:
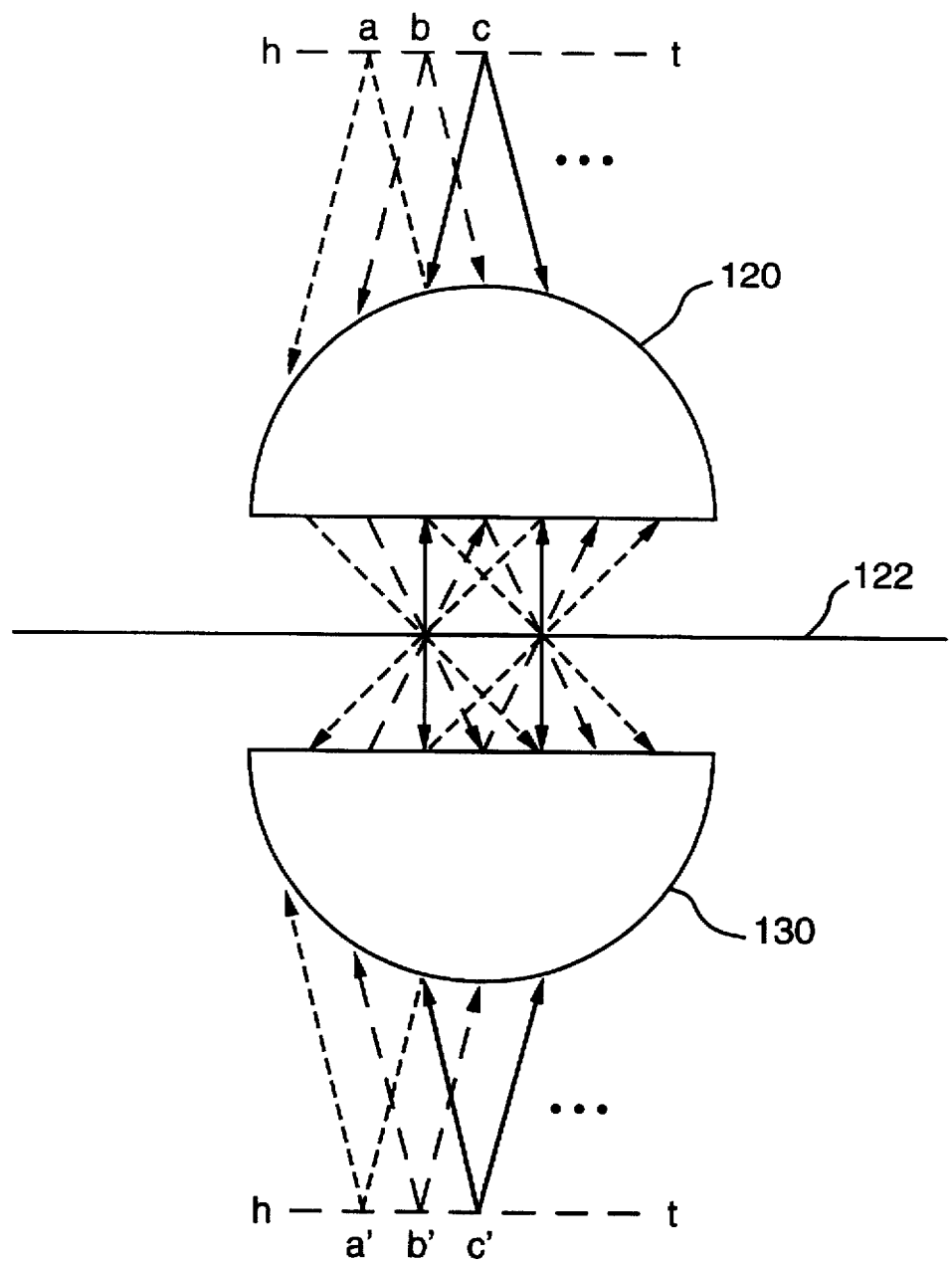
FIG. 15 is an excitation field synthesis ray diagram for the embodiment of FIG. 13.

The improved optical microscope for viewing/imaging a luminescent specimen uses interferometric illumination for generating a superposition of axial standing wave fields in the specimen. In previous embodiments of the instrument single standing wave fields are used, or a series of time-multiplexed standing wave fields having different node plane spacing. In the time-multiplexed case (FIG. 7), the resulting averaged field can be peaked at the in-focus plane in the specimen, thereby highlighting the in-focus features to a greater degree than out-of-focus features. The embodiment of FIG. 13 is a significant improvement over the use of single standing-wave fields which are axially periodic and is a significant improvement over time-multiplexing. The interferometric improvement of FIG. 13 permits the use of an extended, low-coherence light source, such as an arc lamp, to simultaneously provide the superposed standing-wave fields. This optical design also allows for the use of a laser light source. If the laser output is scrambled (de-cohered by moving scatterers or in a vibrating fiber optic), it is equivalent to an incoherent source, but is already essentially monochromatic. A laser beam may also be used directly, by rapid scanning of the laser beam in a line across the beam splitter 160 of the instrument. This second use of the laser is similar to the system disclosed in FIG. 7 in which a scanning mirror is used to sweep the crossing angle of the interfering beams in the specimen. The present embodiment is much improved because it incorporates a beam splitter system that ensures balance of the two optical paths for all beam crossing angles in the specimen. The new arrangement also allows for precision phase shifting of one beam path relative to the other by submicron axial movement of the beam splitter 160. The most important improvement, however, is the use of an extended light source, which is bandpass filtered (to adjust the coherence length) and imaged as an s-polarized line ("h - - - t" in FIGS. 13 and 14a) on the beam splitter 160 and in the rear focal planes of objectives 120 and 130 (FIGS. 13 and 15). Collimator and field lenses in each beam path, 155 and 125 in the lower beam path, 161 and 164 in the upper beam path, re-image the line source in the rear focal plane of each of the paired microscope objectives (FIG. 15). Each corresponding pair of image points (a and a', b and b', c and c' in FIG. 15) is coherent, but there is little or no coherence between distinct pairs (i.e. a—a' is incoherent with respect to b—b'). Therefore, each standing wave field is formed independently (superimposed without cross-interference) and the result is equivalent to the time-multiplexed case, but with much simpler optics. Because the two beam paths are balanced, all of the individual standing-wave fields have the same offset at the common in-focus plane of the two objectives. This offset can be controlled by shifting the relative length of the two beam paths in the interferometer, most easily accomplished by submicron axial movement of the beam splitter 160. As an alternative to a single polarized line source imaged onto beam splitter 160, the full aperture of 160 could be utilized with more complex polarizer and transmittance patterns such as are created with alternative polarization and transmittance masks 152a, 152b and 152c shown in FIGS. 14a, 14b and 14c, respectively. Polarization and transmittance masking can be accomplished by separate masks which perform only one of these functions.

Figure 16:
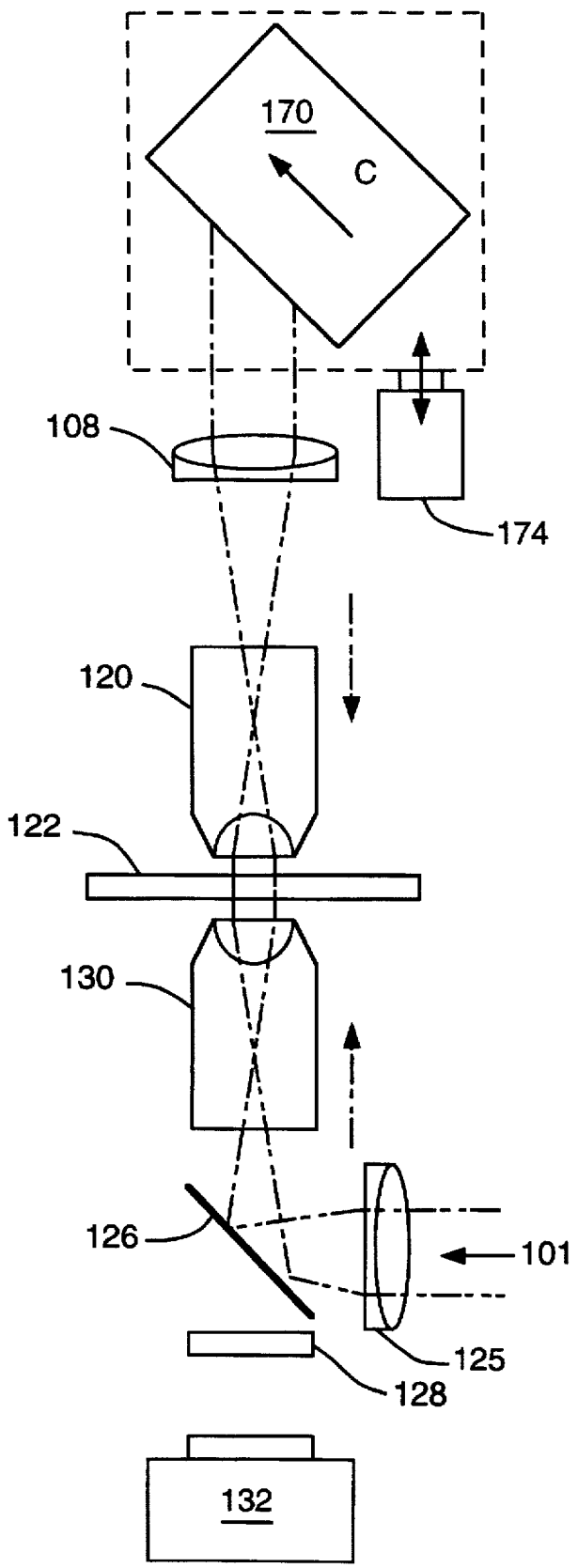
FIG. 16 is a diagram of another preferred embodiment which uses a phase conjugator in a self-pumped arrangement.
Figure 17:
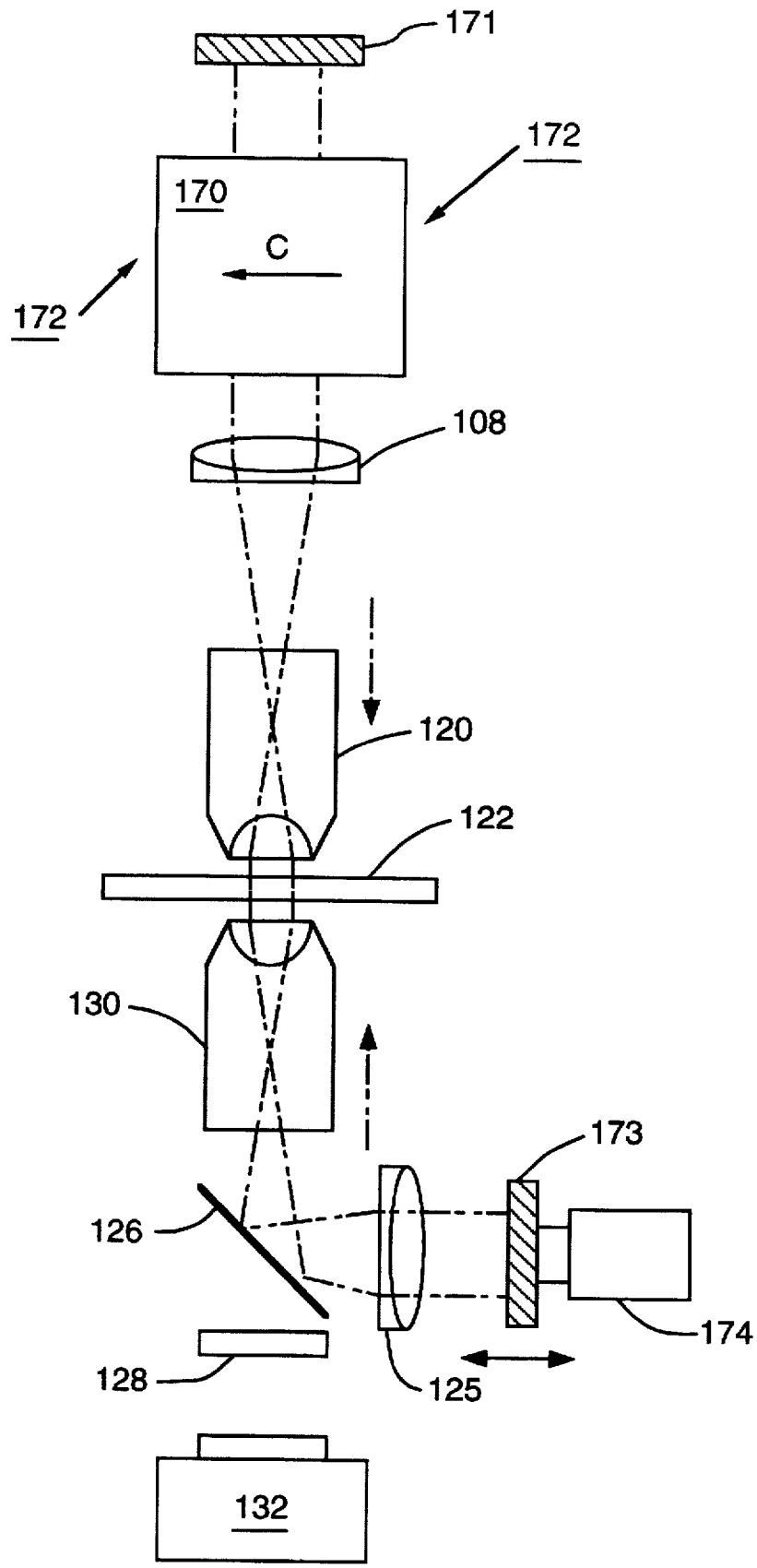
FIG. 17 is a diagram of yet another preferred embodiment which uses a phase conjugator in an externally-pumped arrangement.

As an alternative to the use of a phase conjugator in place of mirror 16 in FIG. 5, the phase conjugator 170 (FIG. 16) can be coupled to the specimen 122 via other optical elements such as an objective lens 120 and field lens 108. The phase conjugator can be operated in the self-pumped mode as shown in FIG. 16 in which expanded laser beam 101 drives the conjugator. Piezo 174 moves the conjugator axially to adjust the position of the standing wave field relative to the specimen 122. The conjugator can also be operated in the externally pumped mode as shown in FIG. 17, in which a laser provides beams 172 directly to the conjugator and the position of the standing wave field relative to the specimen is adjusted via axial movement of piezo-driven mirror 173. The advantage of the embodiments of FIGS. 16 and 17 over the use of the conjugator in place of mirror 16 in FIG. 5 is that phase conjugation is more efficient when expanded beams are used.

In the embodiments shown in FIGS. 7, 10, 13, 15, 16 and 17 a single standing wave field can be created by directing a light beam through the specimen along a path parallel to the optical axis of the microscope. A mirror is mounted immediately opposite the lens so that collimated coherent light emerges on-axis from the lens, passes through the specimen and is back-reflected from the mirror to produce a single standing wave field through the specimen or a beam is split and directed into the specimen from opposite sides on-axis. The ability to use on-axis light beams in a standing wave microscope has not heretofore been recognized. Indeed, all embodiments in U.S. Pat. No. 4,621,911 show off-axis beams.

The illustrated embodiments were described as using monochromatic light. Inherent in that method is the use of a single luminescent dye responsive to that light. It is possible to label a specimen with two or more luminescent dyes which are excited by different wavelengths of light. If the specimen is marked with more than one dye, the specimen is first excited with a light beam having a wavelength which will excite one luminescent dye and which will establish a first standing wave field having a nodal plane coincident with a stratum through the specimen. An image of the excited specimen is recorded. Then, the specimen is excited with a second light beam that has a different wavelength, and excites a second luminescent dye in the specimen. A second image of the specimen is then made. The two images are then combined by any suitable image processing technique to create a combined image of the specimen. This can be repeated at each focal plane and for any desired number of luminescent dyes. Furthermore, the entire process can be automated.

In standing wave microscopes of the type here disclosed one may encounter drift of focus and drift of standing wave field position. This is noticeable in a standing wave microscope, but not in a conventional microscope, because of the increased axial resolution in the standing wave microscope. One solution to this problem is to construct a microscope having extremely rigid mechanical components. This is very expensive. Another solution is to use feedback stabilization of the position of the specimen relative to one objective lens of the microscope as described in "Feedback-Stabilized Focal Plane Control for Light Microscopes" by Frederick Lanni, *Review of Scientific Instruments*, Volume 64, Jun., 1993, pp. 1474–1477.

Figure 18:
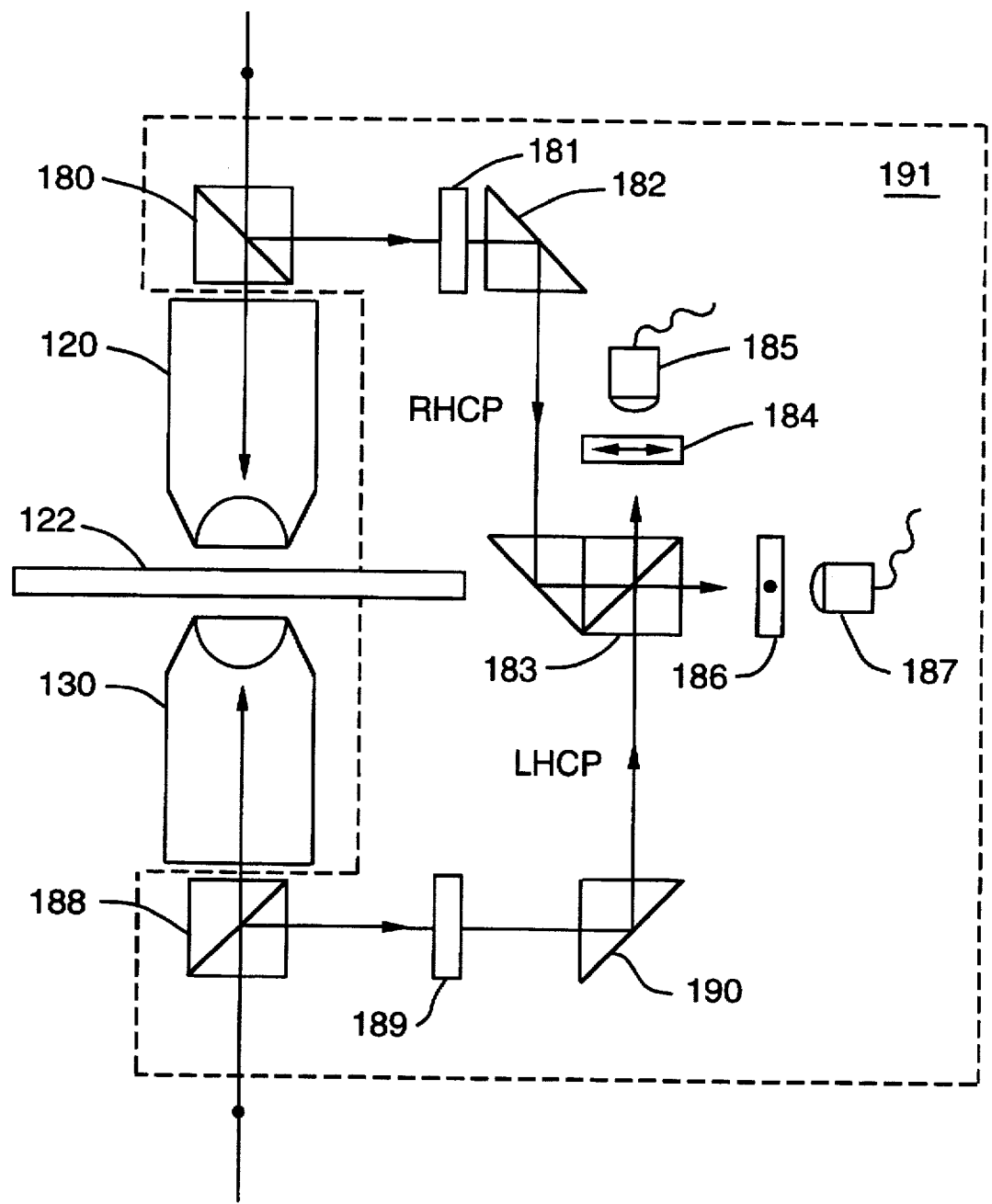
FIG. 18 is a diagram of an interferometer connected to a standing wave microscope having two objectives wherein the interferometer is used to detect and compensate for beam phase drift.

Standing wave field drift can also be corrected by feedback stabilized control of the phase of one of the two interfering beams. FIG. 18 illustrates a present preferred feedback stabilization control device. Drift can originate in any part of the optical train at or beyond the point at which the second beam is generated. Therefore, the detection of drift should occur as close as possible to the specimen. A practical method can be to split off a portion of the light in the counter propagating beams as close as possible to where the beams enter the paired objectives. In FIG. 18 specimen 122 is positioned between objectives 120 and 130. Beam splitters 180 and 188 direct a portion of the beams through quarter-wave plates 181 and 189, and prisms or mirrors 182 and 190 to a beam combiner 183 and then through linear polarizers 184 and 186 to dual photodiode detectors 185 and 187. The components enclosed in box 191 constitute an interferometer. Polarization components 181, 189, 184, and 186 make the interferometer direction-sensitive by converting the linear polarization of the original beams to right-handed and left-handed circularly-polarized light (RHCP and LHCP in FIG. 18). Because the diode detectors 185, 187 are made polarization-sensitive by linear polarizers 184, 186, the brightness of the light received by the photodiodes depends on the direction and degree of drift. Signals from the photodiode detectors can be used to adjust the phase of one of the light beams to compensate for any drift. Such compensation is most easily done through activation of the peizo 136 in FIG. 10 or movable beam splitter 160 in FIG. 13. We have observed that in the mirror configuration of FIG. 5 beam phase drift is not a problem.

Although we have described and illustrated certain present preferred embodiments of our method and apparatus for field synthesis and optical subsectioning for standing wave microscopy, it should be understood that our invention is not limited thereto, but may be variously embodied within the scope of the following claims.

We claim:

1. An apparatus comprising:
   an extended incoherent light source;
   a moveable beam splitter positioned such that light from said light source is imaged onto said beam splitter and split into an upper beam and a lower beam traveling in respective optical paths;
   two objective lenses positionable to cause light beams passing through said lenses to form standing wave fields identically positioned relative to a plane of focus; and,
   a plurality of reflective surfaces positioned to orient and balance the respective optical paths of said upper and lower beams from the beam splitter to said plane to within the coherence length of said light beams with respect to each other and reflect said upper and lower beams through separate ones of said two objective lenses to generate a multiplicity of standing wave fields relative to said plane.

2. The apparatus of claim 1 further comprising at least one polarization mask between the light source and the beam splitter.

3. The apparatus of claim 1 further comprising at least one transmittance mask between the light source and the beam splitter.

4. The apparatus of claim 1, wherein said incoherent light source comprises a scrambled laser source.

5. The apparatus of claim 1, wherein said incoherent light source comprises a laser rapidly swept in a pattern across said beam splitter.

6. The apparatus of claim 1, wherein said beam splitter is moveable to shift the phase of one of said upper and lower beam path with respect to the other beam path.

7. The apparatus of claim 1 wherein said plurality of reflective surfaces further comprises an odd number of reflective surfaces for one of said upper and lower beams and an even number of reflective surfaces for the other of said beams.

8. The apparatus of claim 1 further comprising a wavelength filter positioned between said incoherent light source and said beam splitter to filter said light being imaged on said beam splitter.

9. The apparatus of claim 8 further comprising a polarizing filter positioned between said incoherent light source and said beam splitter to filter said light being imaged on said beam splitter.

10. The apparatus of claim 9 further comprising a camera positioned relative to one of said objective lenses to record an image at said plane of focus.

11. The apparatus of claim 10 further comprising an image processor connected to said camera to combine images recorded by said camera.

12. A method of producing standing waves relative to a plane of focus, said method comprising:
    positioning two objective lenses to cause light beams passing through different said lenses to form standing wave fields identically positioned relative to a plane of focus
    providing an extended incoherent light source to emit a light beam;
    splitting the light beam emitted from the light source into upper and lower beams traveling in respective optical paths; and,
    reflecting the upper and lower light beams to orient and balance the respective optical paths of said upper and lower beams to the plane to within the coherence length of said light beams with respect to each other and to direct the upper and lower beam through separate ones of said objective lenses to generate a multiplicity of standing wave fields relative to the plane of focus.

13. The method of claim 12, further comprising polarizing the light beam to produce s-polarized standing waves in the specimen.

14. The method of claim 12, wherein said method includes recording an image at the plane of focus, said method further comprises:
    labeling a specimen with a fluorescent or phosphorescent label that can be excited by the standing wave fields and emit light;
    placing the specimen in the plane of focus; and, recording a first image produced by the light emitted by the label.

15. The method of claim 14, further comprising:
    shifting the phase of one of the upper and lower beams relative to the other beam;
    recording a second image produced by the light emitted by the label; and,
    combining the first and second images to create a combined image.

16. The method of claim 15, further comprising polarizing the light beam to produce s-polarized standing waves in the specimen.

17. The method claim 16, wherein:
    said splitting further comprises splitting the light beam to produce an intensity antinode at the plane; and,
    said shifting further comprises shifting the phase of one of the upper and lower beams relative to the other beam to produce an intensity node at the plane.

18. An apparatus comprising:
    an extended incoherent light source;
    a moveable beam splitter positioned such that light from said light source is imaged onto said beam splitter and split into an upper beam and a lower beam;
    a polarizing filter positioned between said incoherent light source and said beam splitter to filter said light being imaged on said beam splitter;
    a wavelength filter positioned between said incoherent light source and said beam splitter to filter said light being imaged on said beam splitter;
    two objective lenses positionable to cause light beams passing through said lenses to form standing wave fields identically positioned relative to a plane of focus; and, a plurality of reflective surfaces positioned to orient and balance the optical paths of said upper and lower beams from the beam splitter to said plane to within the coherence length of said light beams with respect to each other and to reflect said upper and lower beams through separate ones of said two objective lens to generate a multiplicity of standing wave fields relative to said plane.

19. The apparatus of claim 18 further comprising a camera positioned relative to one of said objective lenses to record an image at said plane of focus.

20. The apparatus of claim 18 further comprising at least one transmittance mask positioned between said incoherent light source and said beam splitter to filter said light being imaged on said beam splitter.

* * * * *

UNITED STATES PATENT AND TRADEMARK OFFICE
CERTIFICATE OF CORRECTION

PATENT NO. : 5,801,881
DATED : September 1, 1998
INVENTOR(S) : Lanni et al.

Page 1 of 1

Figure 8D:
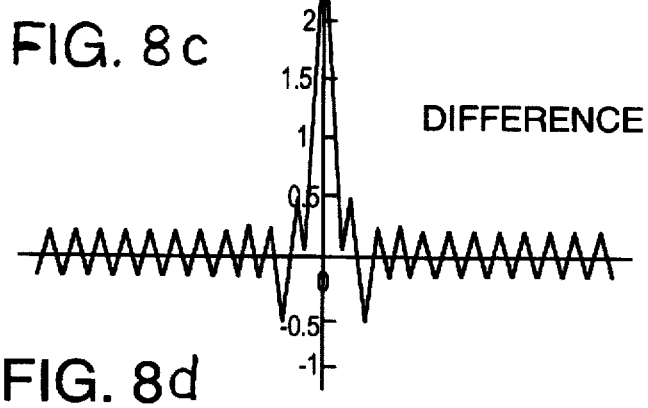

It is certified that error appears in the above-identified patent and that said Letters Patent is hereby corrected as shown below:

Column 4,
Line 49, delete "is a graph";

Column 6,
Line 30, delete "µm" and substitute therefor -- mm --;

Column 10,
Line 16, delete "8b" and substitute therefor -- 8c --;
Line 20, after "plane", delete "as, shown in FIG. 8c" and substitute therefor -- , as shown in FIG. 8d --;
Line 22, delete "6" and substitute therefor -- 8b --; and
Line 48, after "method" insert -- of --.

Signed and Sealed this

Fourth Day of December, 2001

Attest:

*Nicholas P. Godici*

NICHOLAS P. GODICI
*Attesting Officer*     *Acting Director of the United States Patent and Trademark Office*